US005703743A

United States Patent [19]

Lee

[11] Patent Number: 5,703,743

[45] Date of Patent: Dec. 30, 1997

[54] TWO TERMINAL ACTIVE ARC SUPPRESSOR

[75] Inventor: Tony J. Lee, Pullman, Wash.

[73] Assignee: Schweitzer Engineering Laboratories, Inc.

[21] Appl. No.: 641,112

[22] Filed: Apr. 29, 1996

[51] Int. Cl.[6] .................................................. H02H 3/00

[52] U.S. Cl. ...................................... 361/6; 361/4; 361/8

[58] Field of Search .................................. 361/2–4, 6, 8, 361/9–10, 13, 159, 56; 307/115, 137

[56] References Cited

U.S. PATENT DOCUMENTS

| | | | |
|---|---|---|---|
| 4,438,472 | 3/1984 | Woodworth | 361/13 |
| 4,658,320 | 4/1987 | Hongel | 361/13 |
| 5,081,558 | 1/1992 | Mahler | 361/13 |
| 5,402,297 | 3/1995 | Ouchi et al. | 361/4 |
| 5,452,170 | 9/1995 | Ohde et al. | 361/13 |

*Primary Examiner*—Jeffrey A. Gaffin
*Assistant Examiner*—Michael Sherry
*Attorney, Agent, or Firm*—Jensen & Puntigam, P.S.

[57] ABSTRACT

The arc suppression circuit includes an insulated gate bipolar junction transistor (IGBT) connected across the electrical switch contacts to be protected. When the contacts open, the combination of added Miller capacitance and the gate-to-emitter capacitance of the IGBT results in the IGBT turning on. The IGBT is quickly turned off thereafter by a second transistor, which turns on as the voltage across the suppression circuit rises following turn-on of the IGBT. The turning on of the second transistor results in the first power transistor quickly and abruptly turning off so that relatively little of the load energy is dissipated in the power transistor.

24 Claims, 3 Drawing Sheets

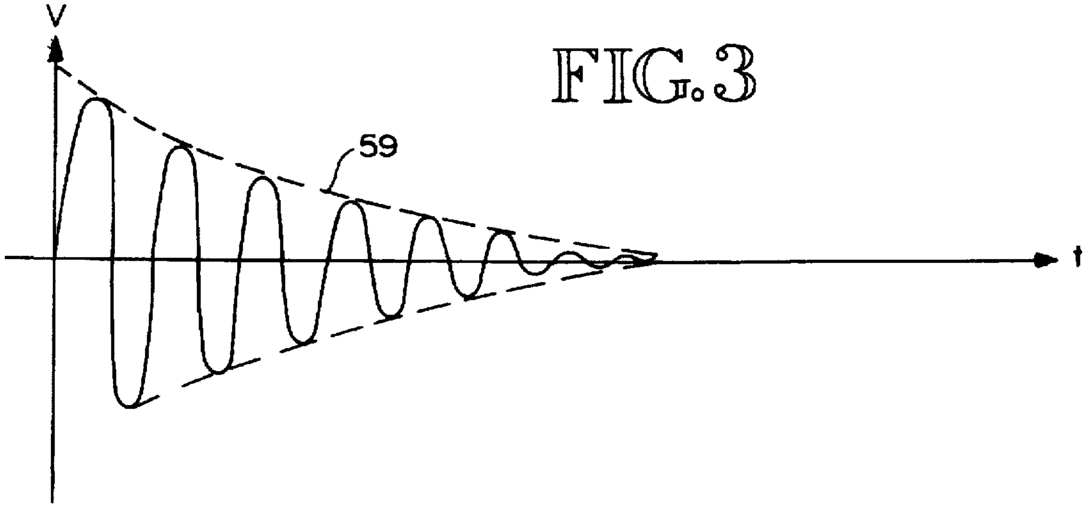
FIG. 3
FIG. 4
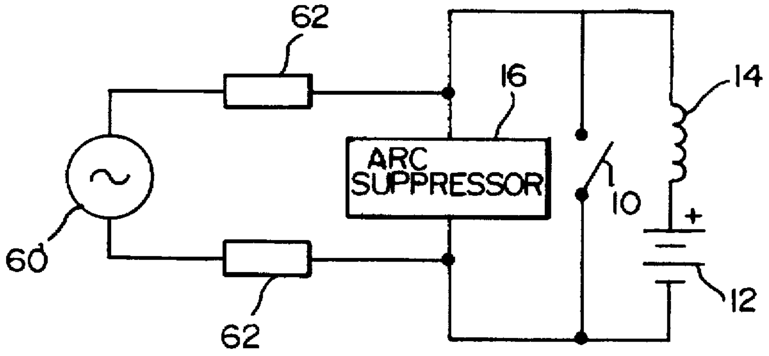

TWO TERMINAL ACTIVE ARC SUPPRESSOR

TECHNICAL FIELD

This invention relates generally to arc suppressor circuits for electrical contacts and more specifically concerns such a circuit which includes a power transistor, such as an IGBT, connected in parallel with the electrical contacts being protected, wherein the protective circuit can be used with a wide variety of electrical contact arrangements.

BACKGROUND OF THE INVENTION

As indicated in U.S. Pat. No. 5,652,688, a common problem with electrical contacts, i.e. the mechanical contacts used in electric or electromechanical circuits, through which current flows when the contacts are closed, is the creation of an electrical arc between the contacts as they begin to open from a closed position. This can occur as contacts open, either if the contacts are normally closed or normally open. If the voltage across the contacts as they open reaches a sufficient level, an arc will form between the contacts. Further, this arc may continue even after the contacts are well open. This arcing is well known to be undesirable because of the wear it produces on the contacts as well as other circuit effects which may occur due to the arc.

In addition to the design of the contacts themselves, which in some cases provide an inherent arc suppression capability, separate arc suppression circuits have been used to prevent arcing across electrical contacts. These circuits typically include a power transistor with particular operating characteristics. The initial increase in the voltage across the electrical contacts as the contacts open is used as an activating signal to turn the power transistor on, momentarily shunting the load current around the contacts during the time the contacts are opening. Typically, this is accomplished through the use of Miller capacitance connected to the transistor with the current through the Miller capacitance being sufficient to momentarily turn the power transistor on.

One such circuit is shown in U.S. Pat. No. 4,438,472 to Woodworth. Woodworth teaches the basic idea of using a shunting capacitor in combination with a bipolar junction transistor. In this particular implementation, the additional Miller capacitance must be relatively large. This large capacitance, however, remains in parallel with the contacts being protected even when they are fully open, acting in effect as a short circuit relative to any transients which may be impressed across the contacts. This of course is undesirable in many situations. Further, the bipolar junction transistor must be capable of handling the energy from the inductive load as it (the transistor) gradually interrupts the load current.

Another implementation is shown in U.S. Pat. No. 4,658,320 to Hongel. In Hongel, the bipolar junction transistor is replaced with a power field effect transistor (FET). This does have the effect of reducing the size of the large capacitance required by the Woodworth apparatus. However, as with the Woodworth apparatus, the gradual inductive load current interruption requires that virtually all of the load energy be dissipated in the FET itself. An FET capable of handling this is expensive, and is fairly large in size. In addition, the capacitor in Hongel still parallels the open contacts, so that it is susceptible to transient voltages.

The apparatus described in the '688 patent, which is owned by the assignee of the present invention, overcomes many of the disadvantages of the above two circuits. It reduces the necessary Miller capacitance and is designed to prevent electrical conduction through the protective circuit during voltage transients. However, that apparatus was designed to be used with a particular electrical contact arrangement, known generally as a form C contact. In the '185 circuit, the unused portion of the form C contact was used to signal the shunting power transistor when to shut off and to hold that transistor off even in the presence of large voltage transients.

The present invention has all of the advantages of the '688 circuit, but is not limited to a particular contact arrangement. Indeed, it can be used with basically any type of electrical contacts where arcing is a problem, and can be readily designed to operate in a number of different circuit arrangements. Not only can a wide variety of electrical contacts be covered, but various contact separation rates can also be accommodated. Hence, the present invention is quite general in its applicability.

SUMMARY OF THE INVENTION

Accordingly, the invention is a circuit for suppression of arcing across electrical contacts, comprising: a power transistor, such as an IGBT, connected across the contacts; capacitance means, connected between the contacts and the power transistor but not directly across the contacts, sufficient that the power transistor quickly turns on when the contacts begin to open, providing a current path around the contacts, thereby preventing arcing across the contacts; means for turning off the power transistor following sufficient separation of the contacts to prevent arcing thereacross; and voltage limiting means to limit any flyback voltage resulting from the power transistor turning off to a selected level.

BRIEF DESCRIPTION OF THE DRAWINGS

FIG. 3 is a diagram showing one example of an electrical voltage transient.

FIG. 4 shows a simplified electrical representation of the transient source relative to the circuit of the present invention.

BEST MODE FOR CARRYING OUT THE INVENTION

Figure 1:
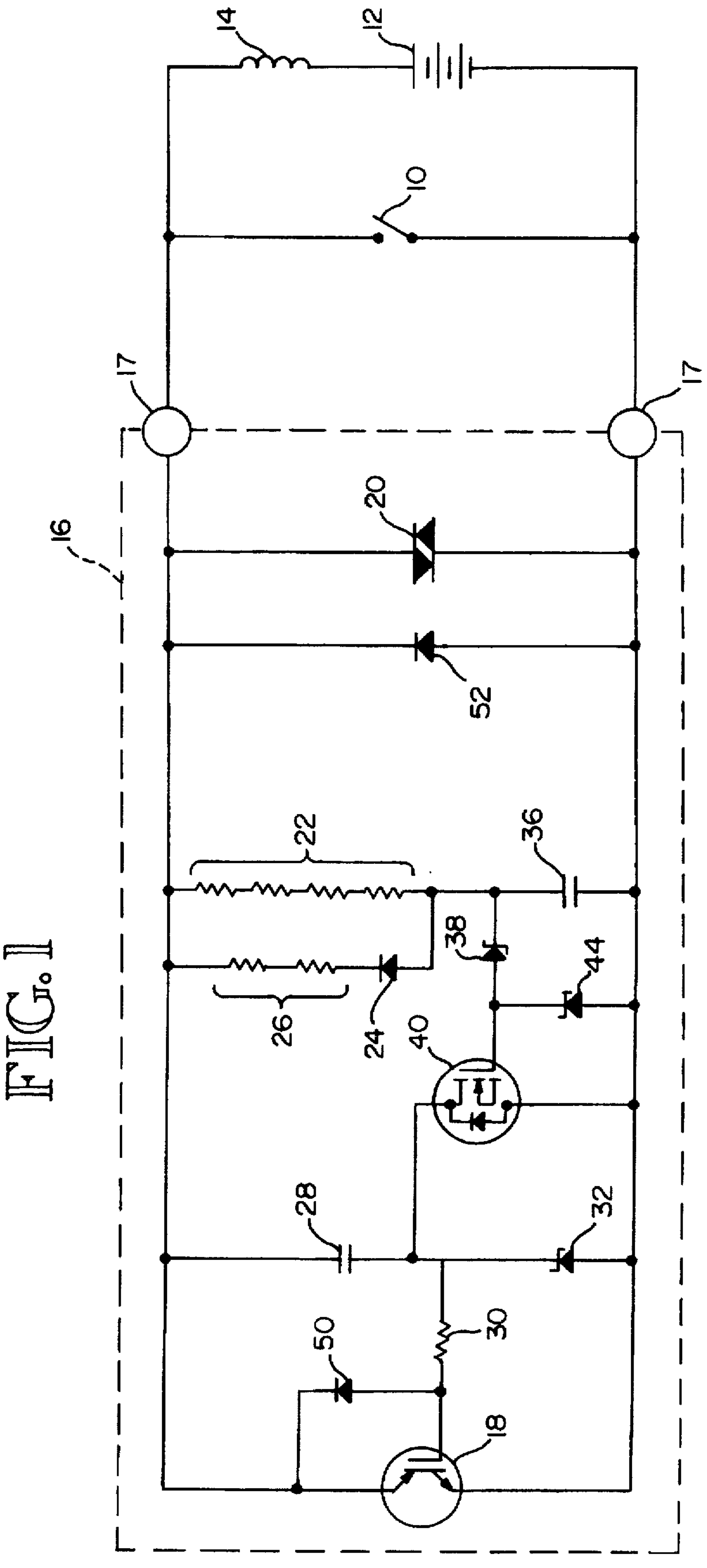
FIG. 1 is a diagram showing one embodiment of the arc suppression circuit of the present invention.

The arc suppression circuit of the present invention, one embodiment of which is shown in FIG. 1, is designed to operate with a wide variety of electrical and/or electromechanical contacts. The electrical contacts, for purposes of illustration, are shown generally at 10. The battery 12 represents a source of voltage operating through a load 14, which in the embodiment shown is a combination of inductance and resistance. The source voltage produces a current through load 14 and through the contacts 10. The arc suppression (protective) circuit of the present invention is shown generally at 16, connected to contacts 10 at connection points 17—17 Arc suppression circuit 16 includes in the embodiment shown a power transistor 18 which in the embodiment shown is an Insulated Gate Bipolar Junction Transistor (IGBT). An IGBT is a Darlington-type combination of a field effect transistor (FET) and a bipolar junction transistor (BJT) capable of handling high power levels.

In general, arc suppression circuit 16 is connected in parallel with contacts 10, such that IGBT 18 shunts the electrical contacts. The load current is briefly shunted around the contacts through the protective circuit as the contacts open, until the contacts have separated sufficiently that they can withstand the source voltage, typically several hundred volts. After contacts 10 have separated, IGBT 18 is quickly and abruptly turned off; the ensuing inductive voltage kick or flyback is limited or clamped by a voltage limiting device, such as a metal oxide varistor (MOV) shown in FIG. 1 at 20. In the embodiment of FIG. 1, the voltage limiting device 20 is internal to the circuit, while in an alternative embodiment, the voltage limiting device is external and may be supplied by the user of the circuit. In that embodiment, the voltage clamping characteristics may be adapted by the user to the particular load and the particular contacts used.

As indicated briefly above, arc suppression circuit 16 can be used with electrical contacts which are normally closed or normally open. In either case, when the contacts open after having been closed with current flowing therethrough, arc suppression circuit 16 operates to prevent an arc from appearing across the electrical contacts. For purposes of explanation of the operation of circuit 16, it will be assumed that contacts 10 are normally closed and that load current is flowing from the positive terminal of voltage source 12 through load 14, through contacts 10 and back to source 12.

As contacts 10 begin to open in response to an electrical control signal or manual operation of a switch, load current through the contacts will terminate and the current will begin to flow in the arc suppression circuit. IGBT 18 will not immediately conduct the current, since it is an off condition. Further, the voltage across contacts 10 is not sufficient to break down the voltage limiting element 20, nor will substantial current flow through combined resistance 22. In addition, because of diode 24, no current will flow through combined resistance 26. This results in current eventually passing through capacitor 28, which is the Miller capacitance, and then through a gate resistor 30, the gate-emitter capacitance of the IGBT 18, and then back to the voltage source 12.

The current established through this path of capacitor 28 and resistor 30 and the gate-emitter capacitance of the IGBT 18 results in both of the capacitances beginning to charge. IGBT 18 will begin to conduct when its gate-to-emitter capacitance charges past its threshold voltage. Capacitor 28 has such a size (for example, 2.2 nanofarads) that the charge which is necessary at the gate of the IGBT to turn it on results in a voltage on capacitor 28 which is small compared to the voltage on the IGBT.

At this point, the voltage across both the arc suppression circuit 16 (i.e. across connection points 17—17) and electrical contacts 10 is limited approximately to the threshold voltage of IGBT 18. As the voltage increases further, more current flows through capacitor 28 and through the gate-emitter portion of IGBT 18, turning on IGBT harder, which limits the voltage increase. At this point, the overall circuit would appear to be in balance; further voltage rise at the gate of the IGBT is limited by this current balance condition. However, any delay in IGBT 18 turning on could result in a destructively high voltage being developed at the gate of the IGBT, which might typically be 20 volts. Zener diode 32 ensures that the voltage on the gate of the IGBT is limited to a value which is below the danger level, while resistance 30 tends to prevent oscillations in IGBT operation.

When IGBT 18 begins to conduct, the voltage developed across arc suppression circuit 16 results in a current flow through resistance 22, charging capacitor 36. When the voltage on capacitor 36 exceeds the reverse breakover voltage of zener diode 38, diode 38 begins to conduct, turning on transistor 40, which in the embodiment shown is an FET. The voltage level across the protective circuit 16 is established by the characteristics of IGBT 18 and the value of Miller capacitor 28.

The turn-on time of FET 40 is controlled by the time constant established by resistance 22 and capacitor 36. The value of resistance 22 also controls the amount of leakage current for the suppression circuit, which might for example be 150 microamps.

The time from the initial separation of contacts 10 to the conduction of zener diode 38 is determined and then established by selecting an appropriate value for capacitor 36. This time delay can be readily matched to the separation rate for the particular contacts being protected. As an example, one millisecond will typically be a safe value, as most contacts separate a sufficient distance to withstand the source voltage in less than one millisecond.

When FET 40 turns on, a path is provided for the discharge of the gate-to-emitter capacitance of IGBT 18. This discharge path includes resistor 30, FET 40 and then back to the emitter of IGBT 18. Once the capacitance is discharged thorough this path, IGBT 18 turns off. This early abrupt turnoff of the IGBT 18 after it has been turned on saves or preserves the IGBT.

Since the contacts 10 are still opening (or in some cases completely open) and the IGBT is turned off, the inductive load current is forced to flow through the voltage limiting device, such as an MOV, shown generally at 20.

The voltage across MOV 20, arc suppression current 16 and contacts 10 increases to the clamping voltage level of MOV 20, typically a few hundred volts. The increase in voltage results in additional current from source voltage 12 through Miller capacitance 36 and FET 40. The additional current, however, because FET 40 is conducting, does not result in IGBT 18 turning back on. Further, because the clamping voltage of MOV 20 is higher than the source voltage 12, a negative voltage is developed across load 14. This negative voltage causes a decrease in the inductive load current flow; shortly thereafter, the inductive load current decreases to zero.

Since current is also now flowing through resistor 22, capacitor 36 will continue to charge. When capacitor 36 has charged, this will result in the gate-source capacitance of FET 40 charging, through zener diode 38. When this charge reaches the breakover voltage of zener diode 44, zener 44 begins to conduct, limiting the gate-to-source voltage of FET 40 to a safe (non-destructive) level.

Since FET 40 is not required to carry significant DC current or hold off a substantial level of voltage, it can be selected such that the amount of charge which must be on its gate-source capacitance to turn on FET 40 is relatively small. Accordingly, arc suppression circuit 16 need only supply a relatively small amount of current through zener 38, for only a short time, to turn FET 40 on. Accordingly, FET 40 turns on quite rapidly after current begins to flow in circuit 16; hence, IGBT 18 turns off rapidly as well, since FET 40 controls the turn-off of IGBT 18. This prompt and abrupt turnoff of IGBT 18 results in basically all of the load current flowing through MOV 20.

Hence, since load current actually flows through IGBT 18 for only a relatively short time, and is quite promptly and abruptly interrupted, the energy which must be dissipated in IGBT 18 is relatively small compared to the total energy which must be dissipated to successfully interrupt the load current. This results in the size and cost of the IGBT being significantly reduced relative to predecessor circuits, such as discussed above. MOV 20, on the other hand, dissipates large amounts of energy, but this is acceptable, since an MOV having such a capability is still relatively inexpensive.

After a time, contacts 10 may close again, due to either manual action or an electrical control signal. When the contacts 10 close, it is important at that point that the arc suppression circuit be brought back to its original operating state (i.e. re-arm) as quickly as possible so that it can accommodate an early reopening. This is particularly necessary in the situation where the contacts may open unintentionally very soon after initially being closed, such as occurs in the case of "contact bounce".

When contacts 10 close, the voltage across the protective circuit 16 falls to zero, resulting in capacitor 36 discharging through diode 24 and resistance 26. This occurs because resistance 26 is selected to be significantly smaller than resistance 22. This discharge current flows back through contacts 10 to capacitor 36. The gate-to-source capacitance of FET 40 will also discharge through zener diode 38, diode 24, resistance 26 and contacts 10, back to FET 40. This results in FET 40 turning off.

Further, the Miller capacitance 28 will discharge through contacts 10, and zener diode 32. Zener diode 32 prevents this discharge current from developing a destructive negative voltage across the gate-to-emitter portion of IGBT 18. Still further, the gate to emitter capacitance of IGBT 18 will discharge through diode 50 and contacts 10.

The fast discharge of capacitors 36 and 28, and the internal capacitance of FET 40 and IGBT 18 will thus quickly return arc suppression circuit 16 to its original condition. This action in effect "re-arms" the protective circuit, so that it is ready for the next opening of contacts 10. Because these capacitances, and resistor 26, are capable of rapidly discharging the capacitances of the protective circuit, the circuit will return to its original state very quickly. As indicated briefly above, this fast re-arming protects contacts 10 from destructive arcing during "contact bounces" following closing of the contacts.

In the event that arc suppression circuit 16 is inadvertently connected backwards at 17—17, diode 52 will limit the negative voltage presented to the arc suppression circuit, protecting the semiconductors in the circuit from destructive voltage levels, until the connection error is realized.

As indicated above, one of the advantages of the circuit of the present invention is its protection against voltage transients. After contacts 10 have opened and the load current through the contacts is at zero, the voltage across protective circuit 16 is equal to the source voltage, i.e., if the source voltage for the load is a 125-volt battery, the voltage across contacts 10 and the protective circuit 16 is also 125 volts DC. As discussed above, the presence of this voltage results in current flow through resistance 22, zener diode 38 and zener diode 44, which holds FET 40 on, which in turn holds IGBT 18 off. This is the "balanced" condition of the circuit after the contacts have been open for a short time. A positive voltage transient which may occur thereafter across the open contacts 10 will, in the circuit shown, result in current flowing through Miller capacitance 28, to the drain connection of FET 40. However, the value of resistor 30, and the on-resistance of FET 40 are selected so that the majority of the current will flow through the FET on-resistance. Hence, a positive voltage transient will not result in IGBT turning on. This provides protection against false triggers of the IGBT due to positive voltage transients.

The circuit of FIG. 1 also protects against oscillating transients, i.e. those transients which comprise alternating positive and negative excursions which decrease in amplitude, either quickly, or over several periods of oscillation. It is important for the protective circuit 16 to hold off such transients without allowing load current to flow from the source voltage through the load. Oscillatory transients present some difficulty because the negative going excursions may be difficult to distinguish from actual closing of contacts 10, since both of those events cause the voltage across arc suppression circuit 16 to rapidly fall.

If arc suppression circuit 16 misinterprets the negative portion of an oscillatory transient as a closing of the contacts, then the ensuing positive excursion will likely activate protective circuit 16 and allow current to flow from the voltage source through the load. An example of an oscillatory transient 59 is shown in FIG. 3. The source of the transient, as shown in FIG. 4, is a transient generator 60 with source impedance 62, applied across the arc suppression (protective) circuit 16. The source voltage, load and contacts are shown at 12, 14 and 10, respectively.

During the negative portion of the oscillatory transient 59, diode 52 (FIG. 1) provides a low impedance path for the resulting current, effectively clipping the negative portion of the voltage transient to about zero volts; the entire transient voltage (negative portion) is thus dropped across the transient source impedance 62.

During the positive portion of the voltage transient 59, diode 52 presents a high impedance to the positive voltage. Any current which flows through the Miller capacitance 36 during this portion of the voltage transient is, as explained above, diverted away from IGBT 18 by FET 40. Hence, IGBT remains off. Any voltage across contacts 10 is allowed to rise until that voltage reaches the breakover voltage of MOV 20. When MOV 20 begins to conduct, it presents a low impedance path for the transient current, so that the high voltage transient is clipped, because most of the voltage is dropped again across source impedance 62.

Thus, the action of diode 59 clips the negative portion of the voltage transient to substantially zero volts, while MOV 20 clips the positive portion of the voltage transient to approximately its breakover voltage, which as an example may be a few hundred volts. The result is an asymmetry in the oscillatory waveform, producing an average DC offset or bias. This offset DC voltage tends to charge capacitor 36 more during the positive portion of the transient than to discharge it during the negative portion. Thus, the positive portion tends to maintain FET 40 on, more than the negative portion tends to turn it off. FET 40 thus remains on during the entire transient, which results in IGBT 18 being held off during the same transient, thereby preventing false triggering of IGBT 18.

The particular operation of FET 40 in response to oscillatory transients results in the fact that FET 40 is allowed to turn off faster than it is allowed to turn on during normal operation. This provides additional protection against arcing during the very quick contact bounce subsequent to initial closing of the contacts. Diodes 24 and 38 and resistance 26 are selected so that the gate-to-source capacitance of FET 40 and capacitor 28 discharge much faster than the values of resistance 22 and zener 38 allow capacitor 36 and the gate-to-source capacitance of FET 40 to charge. Basically, this is due to resistance 26 being selected to be much smaller than resistance 22. Since FET 40 turns off quickly, capacitor 28 and IGBT 18 protect contacts 10 from arcing during bounces.

Even with the above-described protection against various transients, it is possible that IGBT 18 might turn on in response to a charge which for a variety of undetermined reasons occurs directly on the gate-to-emitter capacitance of IGBT 18. Further, if the charge is sufficient to result in IGBT 18 turning on to full conduction, and in addition there is insufficient voltage across protective circuit 16 to properly and quickly operate the IGBT turn-off circuitry comprised of resistance 22, capacitor 36, zener diode 38 and FET 40. Thus, it is possible that the IGBT 18 could continue in full conduction, limited only by leakage currents and/or the action of parasitic capacitors; this is an undesirable condition. However, this possibility is effectively prevented by diode 50 which is connected between the gate and collector of IGBT 18.

Since IGBT 18 has an inherent gate-to-emitter threshold voltage below which it will not conduct, and since diode 50 effectively clamps the collector thereof to a voltage which is at least one diode drop below the threshold voltage, diode 50 effectively prevents the collector-to-emitter voltage from IGBT 18 from dropping below the gate threshold voltage of IGBT 18. This ensures that regardless of how IGBT 18 turns on, there remains sufficient voltage across the protective circuit 16 to operate the IGBT turnoff circuitry, comprised of resistor 22, capacitor 36, diode 38 and FET 40.

Figure 2:
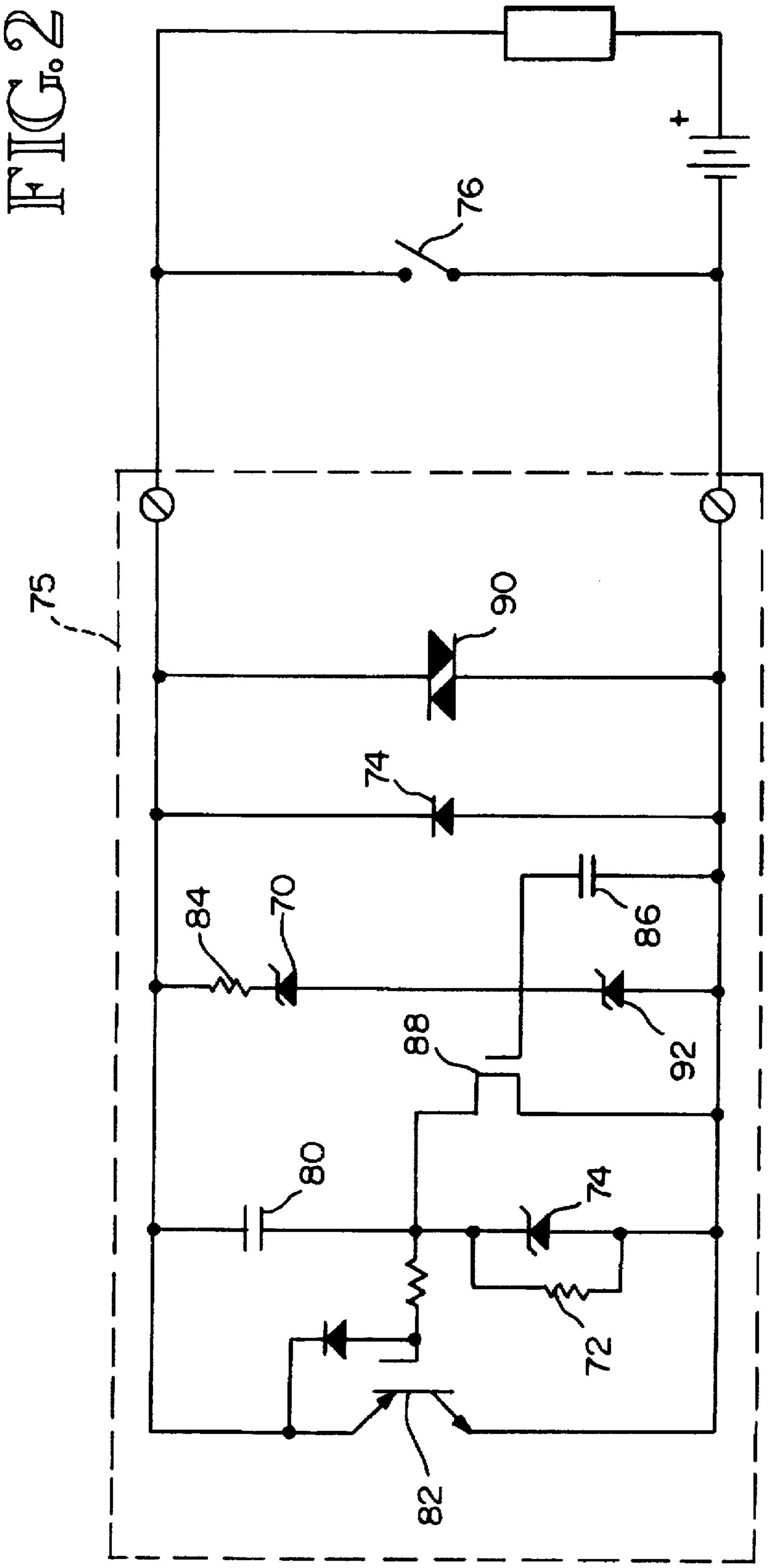
FIG. 2 is an alternative embodiment of the arc suppression circuit of the present invention.

As indicated above, in the circuit of FIG. 1, element 18 is a power transistor. An IGBT satisfies the operational requirements of the circuit and the above description. An example of such an IGBT is IRGBC30S, manufactured by International Rectifier. Other possibilities besides an IGBT could include a power FET. Transistor 40, identified as a field effect transistor in the preferred embodiment, produces a rapid turnoff of IGBT 18, which minimizes the size and cost of IGBT 18. Element 40 could be various fast action devices, including various FETs, a silicone bilateral switch, a unijunction transistor, or a standard thyristor triggered by a zener diode. Further, the inherent positive feedback of the protective circuit 16 itself can be used for the turnoff of IGBT 18. FIG. 2 shows such an alternative circuit.

In the arrangement of FIG. 2, diode 70 is a zener diode. Resistance 22 and the zener diode 38 from the circuit of FIG. 1 have been eliminated. A resistor 72 is in parallel with zener diode 74. In operation, when contacts 76 open, the load current is shunted around the contacts, developing a voltage across the arc suppression (protective) circuit 75. This is basically similar to the circuit of FIG. 1. The voltage across protective circuit 75 increases slowly, due to the current flow in resistor 72, which allows capacitor 80 to charge, which in turn results in the collector-to-gate voltage of the power transistor (IGBT) 82 to increase.

The voltage across contacts 76 also will gradually increase until that voltage reaches the breakover voltage of diode 70. At this point, diode 70 and resistor 84 support current flow and capacitor 86 charges. Capacitor 86 may be an actual component or may be the gate-to-source capacitance of transistor 88 (FET). As capacitor 86 charges, transistor 88 turns on slightly, so that the charge on the gate-to-emitter capacitance of IGBT 82 conducts through transistor 88 and back to IGBT 82, so that IGBT 82 begins to turn off.

This causes the voltage across protective circuit 75 to increase, which in turn causes zener diode 70 and resistor 84 to conduct more current to the gate of transistor 88, turning it on harder. This results in transistor 82 turning off harder, which further increases the voltage across the protective circuit. Hence, a positive feedback arrangement wherein the initial turn-on of transistor 88 initially begins to turn off IGBT 82, which in turn causes transistor 88 to turn on harder, resulting in transistor 82 turning off harder, provides the desired quick circuit response. IGBT 82 turns off quickly and the energy stored in the load is dissipated by MOV 90, as discussed above with respect to FIG. 1. Zener diode 92 limits the voltage at the gate of transistor 88 to a safe level.

The circuit of the present invention may be implemented either as an integrated semiconductor or as a hybrid semiconductor, except for the MOV portion. Permitting the user to supply the MOV, which may be matched to specific load and contact conditions, is both possible and in some cases desirable.

While in the embodiments of FIGS. 1 and 2 the load has been described as an inductive load, it should be understood that various combinations of loads which are capable of producing an arc across an opening of electrical contacts are suitable for use with the arc suppression (protective) circuit of the present invention; i.e. a variety of loads can turn on the protective circuit following opening of the contacts. By appropriate selection of component values, the current and voltages required to initiate an arc across the contacts will also be sufficient to operate the protective circuit, regardless of the load voltage and current.

Hence, an arc suppression circuit has been described which provides protection against arcing between contacts when the contacts open, without being susceptible to false triggers or other undesirable action due to transient voltages. Still further, the circuit is advantageous in that it may be used with a wide variety of electrical contact arrangements and configurations. Further, individual component values can be adapted, particularly the characteristics of the voltage-limiting portion thereof, to particularized voltage and current conditions of the user's application.

Although a preferred embodiment of the invention has been disclosed herein for illustration, it should be understood that various changes, modifications and substitutions may be incorporated in such embodiment without departing from the spirit of the invention which is defined by the claims which follow:

What is claimed is:

1. A circuit for suppression of arcing across electrical contacts, comprising:

a power transistor connected across the contacts;

capacitance means connected between the contacts and the power transistor but not directly across the contacts, sufficient that the power transistor quickly turns on when the contacts begin to open, providing a current path around the contacts, thereby preventing arcing across the contacts;

means for turning off the power transistor following sufficient separation of the contacts to prevent arcing, wherein turning off of the power transistor is sufficiently rapid that a substantial amount of load energy remains to be dissipated; and voltage limiting means to limit any flyback voltage resulting from the power transistor turning off to a selected level and to dissipate remaining load energy.

2. An apparatus of claim 1, wherein the power transistor is an insulated gate bipolar junction transistor.

3. An apparatus of claim 1, including a second transistor connected to the power transistor in such a manner that, as voltage across the suppression circuit rises following opening of the contacts, the second transistor turns on, resulting in the power transistor turning off so quickly that only a relatively small portion of load energy following opening of the contacts is dissipated by the power transistor.

4. An apparatus of claim 1, including means for limiting the voltage on a gate portion of the power transistor to a safe level.

5. An apparatus of claim 4, wherein said limiting means is a zener diode connected between the gate portion of the power transistor and an emitter portion thereof.

6. An apparatus of claim 3, including resistance means connected between a gate portion of the power transistor and the second transistor for preventing oscillations of the power transistor.

7. An apparatus of claim 1, wherein the voltage limiting means includes a voltage clamping element connected across the suppression circuit in parallel with the contacts.

8. An apparatus of claim 7, wherein the voltage clamping element is a metal oxide varistor.

9. An apparatus of claim 1, wherein the capacitance means includes a capacitor connected between a collector portion and the gate portion of the power transistor, wherein the collector portion of the power transistor is connected to one of the contacts and wherein the total charge through said capacitor and the capacitance of the gate-to-emitter junction of the power transistor is sufficient to turn on the power transistor, while the voltage rise produced by the charge is insufficient to initiate an arc across the contacts.

10. An apparatus of claim 9, including means for discharging said capacitance means so that the circuit is ready to again operate after the contacts are closed and then opened again.

11. An apparatus of claim 6, wherein the second transistor has a resistance and wherein said resistance of the second transistor and the resistance means defines a current divider such that very little current proceeds to the gate portion of the power transistor after it has been turned off, thereby preventing false triggering of the power transistor.

12. An apparatus of claim 1, wherein the load is primarily inductive.

13. An apparatus of claim 1, including a diode connected across the suppression circuit and the contacts to provide a low impedance path for negative voltage applied across the contacts.

14. An apparatus of claim 3, including zener diode means connected between a gate portion of the second transistor and a source portion thereof.

15. An apparatus of claim 1, including a diode connected between a gate portion and a collector portion of the power transistor to prevent collector-emitter voltage thereof from decreasing below a gate threshold voltage level.

16. An apparatus of claim 3, including a series connection of a zener diode and a capacitor connected between the second transistor and one of the contacts, a first resistance means connected between (1) the junction of the zener diode and the capacitor and (2) the other contact, and a series connection of a diode and a second resistance means connected between said junction and said other contact, wherein said second resistance means is substantially smaller than said first resistance means.

17. A circuit for suppression of arcing across electrical contacts, comprising:

a power transistor connected across the contacts;

capacitance means connected between the contacts and the power transistor but not directly across the contacts, sufficient that the power transistor quickly turns on when the contacts begin to open, providing a current path around the contacts, thereby preventing arcing across the contacts the contacts;

means for turning off the power transistor following sufficient separation of the contacts to prevent arcing, wherein the circuit is used with a voltage limiting means to limit any flyback voltage resulting from the power transistor turning off to a selected level; and a second transistor connected to the power transistor in such a manner that, as voltage across the suppression circuit rises following opening of the contacts, the second transistor turns on, resulting in the power transistor turning off so quickly that only a relatively small portion of load energy following opening of the contacts is dissipated by the power transistor.

18. An apparatus of claim 17, including means for limiting the voltage on a gate portion of the power transistor to a safe level, wherein said limiting means is a zener diode connected between the gate portion on the power transistor and an emitter portion thereof.

19. An apparatus of claim 18, including resistance means connected between a gate portion of the power transistor and the second transistor for preventing oscillations of the power transistor.

20. An apparatus of claim 17, wherein the capacitance means includes a capacitor connected between a collector portion and the gate portion of the power transistor, wherein the collector portion of the power transistor is connected to one of the contacts and wherein the total charge through said capacitor and the capacitance of the gate-to-emitter junction of the power transistor is sufficient to turn on the power transistor, while the voltage rise produced by the charge is insufficient to initiate an arc across the contacts.

21. An apparatus of claim 20, including means for discharging said capacitance means so that the circuit is ready to again operate after the contacts are closed and then opened again.

22. An apparatus of claim 19, wherein said second transistor has a resistance and wherein the resistance of the second transistor and the resistance means defines a current divider such that very little current proceeds to the gate portion of the power transistor after it has been turned off, thereby preventing false triggering of the power transistor.

23. An apparatus of claim 17, including a diode connected across the suppression circuit and the contacts to provide a low impedance path for negative voltage applied across the contacts.

24. An apparatus of claim 17, including a diode connected between a gate portion and a collector portion of the power transistor to prevent collector-emitter voltage thereof from decreasing below a gate threshold voltage level.

* * * * *